United States Patent
Yamamoto et al.

(10) Patent No.: US 10,286,494 B2
(45) Date of Patent: May 14, 2019

(54) METHOD FOR MANUFACTURING CORE BARREL AND CORE BARREL

(71) Applicant: Kabushiki Kaisha Toshiba, Minato-ku (JP)

(72) Inventors: Akira Yamamoto, Ota (JP); Yoshiaki Ono, Zushi (JP); Daiki Maruyama, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 276 days.

(21) Appl. No.: 15/018,961

(22) Filed: Feb. 9, 2016

(65) Prior Publication Data

US 2016/0240271 A1     Aug. 18, 2016

(30) Foreign Application Priority Data

Feb. 17, 2015     (JP) .................................. 2015-028871

(51) Int. Cl.
   *B23K 31/02*     (2006.01)
   *G21C 13/00*     (2006.01)
   (Continued)

(52) U.S. Cl.
   CPC .............. *B23K 31/02* (2013.01); *G21C 13/02* (2013.01); *B23K 2101/12* (2018.08);
   (Continued)

(58) Field of Classification Search
   CPC .......... G21C 5/10; G21C 13/00; G21C 13/02; G21C 13/024; G21C 13/08; G21C 13/087;
   (Continued)

(56) References Cited

U.S. PATENT DOCUMENTS 3,424,239 A * 1/1969 Coudray ................ G21C 13/00
                                                                165/136
4,615,862 A * 10/1986 Huckestein .............. G21C 5/06
                                                                376/362

(Continued)

FOREIGN PATENT DOCUMENTS

CN            86107494 A        6/1987
CN          203026147 U         6/2013

(Continued)

OTHER PUBLICATIONS

Combined Office Action and Search Report dated Apr. 1, 2017 in Chinese Patent Application No. 201610089875.2 with unedited computer generated English translation.

(Continued)

*Primary Examiner* — Jack W Keith
*Assistant Examiner* — Sandra Herrick
(74) *Attorney, Agent, or Firm* — Oblon, McClelland, Maier & Neustadt, L.L.P.

(57) ABSTRACT

A method for manufacturing a core barrel according to the embodiment includes: welding one end part of a short ring to a lower core support plate; and machining the lower core support plate to which the short ring is welded. The machining of the lower core support plate includes forming a placement surface on which the fuel assembly is to be placed; and forming a fuel alignment pin hole, in which a fuel alignment pin for positioning the fuel assembly is to be inserted. After the machining of the lower core support plate, a main body barrel is welded to the other end part of the short ring, where the main body barrel covers the reactor core including the fuel assembly to be placed on the placement surface.

5 Claims, 6 Drawing Sheets

(51) Int. Cl.
*G21C 13/02* (2006.01)
*G21C 13/08* (2006.01)
*B23K 101/12* (2006.01)
*G21C 13/024* (2006.01)
*G21C 13/087* (2006.01)
*G21C 13/093* (2006.01)

(52) U.S. Cl.
CPC ............ *G21C 13/00* (2013.01); *G21C 13/024* (2013.01); *G21C 13/08* (2013.01); *G21C 13/087* (2013.01); *G21C 13/093* (2013.01); *Y02E 30/40* (2013.01)

(58) Field of Classification Search
CPC . G21C 13/093; G21C 19/207; B23K 2101/12
USPC ........................................................ 376/362
See application file for complete search history.

(56) References Cited

U.S. PATENT DOCUMENTS

| | | | |
|---|---|---|---|
| 4,756,877 A | 7/1988 | Veronesi et al. | |
| 5,220,527 A | 6/1993 | Ohsawa | |
| 5,621,778 A * | 4/1997 | Erbes | G21C 13/02 376/285 |
| 6,021,170 A | 2/2000 | Reimer et al. | |
| 2006/0251205 A1 | 11/2006 | Balog | |
| 2017/0232540 A1* | 8/2017 | Teramae | B23K 9/0026 219/125.11 |

FOREIGN PATENT DOCUMENTS

| | | |
|---|---|---|
| CN | 103903655 A | 7/2014 |
| JP | 48-033296 A | 5/1973 |
| JP | 57-000385 A | 1/1982 |
| JP | 05-281386 A | 10/1993 |
| JP | 2001-108778 A | 4/2001 |
| JP | 2012-088205 | 5/2012 |
| KR | 10-0197757 B1 | 6/1999 |

OTHER PUBLICATIONS

Gong Hongwei, "AP1000 hanging flower basket barrel with the research of reactor core board bearing plate welding deformation down", Chinese Science and Technology Review., Oct. 8, 2014, pp. 47-49.

Korean Office Action dated Oct. 5, 2016 in patent application No. 10-2016-0017680 with English translation.

* cited by examiner

METHOD FOR MANUFACTURING CORE BARREL AND CORE BARREL

CROSS REFERENCE TO RELATED APPLICATIONS

This application is based upon and claims the benefit of priority from Japanese Patent Application No. 2015-028871, filed on Feb. 17, 2015, the entire contents of which are incorporated herein by reference.

FIELD

An embodiment of the present invention relates to a method for manufacturing a core barrel and a core barrel.

BACKGROUND

In a pressure vessel of a pressurized water reactor, there is provided a core barrel (also referred to as a "reactor core tank") holding a reactor core including a fuel assembly. The core barrel has a function to support a weight of the fuel assembly and a function to position the fuel assembly.

In a conventional pressurized water reactor, the fuel assembly is placed on a lower core plate, a lower core support plate is provided under the lower core plate, and the lower core plate is attached to the lower core support plate through a lower core support column. With this configuration, the fuel assembly is supported by the lower core support plate constituting the core barrel.

The above-described lower core support column is fastened to the lower core plate and the lower core support plate with bolts or the like. With this arrangement, the fuel assembly may be damaged when the bolt is broken. In order to address this issue, a structure has been conceived in which a lower core support plate and a lower core plate are integrated so that the lower core support plate has a function of the lower core plate and in which a fuel assembly is placed on the lower core support plate.

Figure 5:
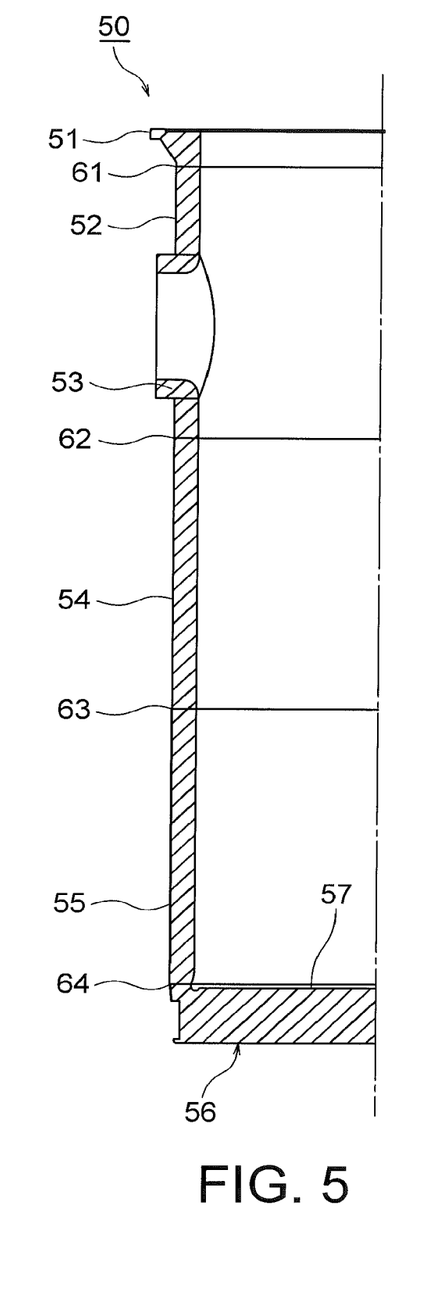
FIG. 5 is a vertical sectional view showing a typical core barrel, where the right half is not shown.
Figure 6:
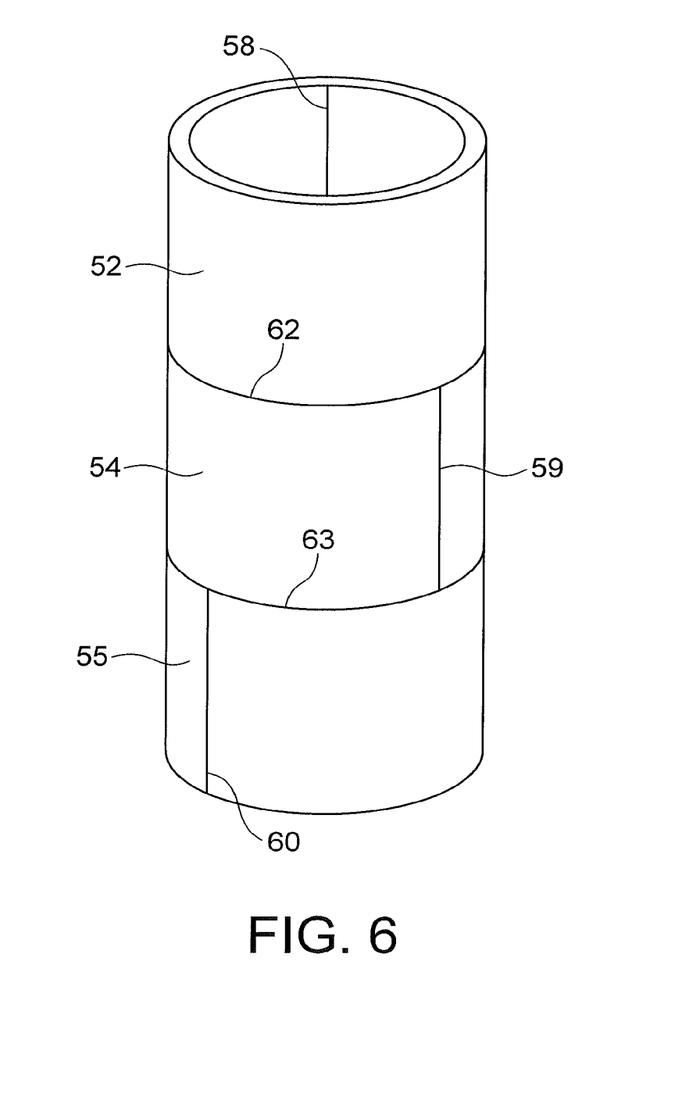
FIG. 6 is a perspective view showing weld lines of barrels of FIG. 5.

FIG. 5 shows an example of a core barrel used in such a structure. A core barrel 50 shown in FIG. 5 includes a flange 51 to be attached to a reactor pressure vessel, an upper barrel 52 extending downward from the flange 51, a nozzle 53 provided on the upper barrel 52, an middle barrel 54 extending downward from the upper barrel 52, a lower barrel 55 extending downward from the middle barrel 54, the above-described lower core support plate 56 connected to the lower end part of the lower barrel 55. In the above members, the lower core support plate 56 has a placement surface 57 on which a fuel assembly is to be placed. The upper barrel 52, the middle barrel 54, and the lower barrel 55 are made, as shown in FIG. 6, by bended plate-shaped members in a cylindrical shape and by welding the bended members to one another, and on the respective curbed members, there are formed an upper barrel vertical weld line 58, an middle barrel vertical weld line 59, and a lower barrel vertical weld line 60. Further, as shown in FIG. 5, between the flange 51 and the upper barrel 52 is formed a flange circumferential weld line 61, between the upper barrel 52 and the middle barrel 54 is formed an upper barrel circumferential weld line 62, between the middle barrel 54 and the lower barrel 55 is formed an middle barrel circumferential weld line 63, and between the lower barrel 55 and the lower core support plate 56 is formed a lower core support plate circumferential weld line 64.

As described above, the core barrel is made in a welded can structure. However, if the weld line is faced to the fuel assembly, radiation emitted from the fuel assembly may cause, in some cases, stress corrosion cracking, thermal embrittlement, and irradiation embrittlement. For this reason, in the form in which a fuel assembly is supported through a lower core plate and a lower core support column by a lower core support plate, a core barrel manufactured by forging is known to reduce weld lines facing the fuel assembly.

In the process of manufacturing the core barrel shown in FIG. 5, first the lower core support plate 56 is machined to form the placement surface 57 and fuel alignment pin holes (not shown) in which fuel alignment pins for positioning the fuel assembly are to be inserted. Subsequently, the lower barrel 55 is welded to the lower core support plate 56. Then, the flange 51, the upper barrel 52, and the middle barrel 54 are welded to the lower barrel 55.

A high accuracy is generally required in a holding position of each fuel assembly in a reactor core. Therefore, it is desirable that a flatness of the placement surface 57 of the lower core support plate 56 and the positions or the shapes of the fuel alignment pin holes should have high accuracy.

However, lower core support plate circumferential weld line 64 is formed at a position close to the placement surface 57 of the lower core support plate 56. Therefore, due to influence of the welding when the lower core support plate circumferential weld line 64 is formed, it may happen that the accuracies of the flatness of the placement surface 57 or the fuel alignment pin holes which are already formed by machining cannot satisfy required values. In this case, it can be difficult to secure the accuracy of the position of each fuel assembly.

DETAILED DESCRIPTION

A method for manufacturing a core barrel according to an embodiment is a method for manufacturing a core barrel which is to be disposed in a reactor pressure vessel of a pressurized water reactor and is to hold a reactor core including a fuel assembly. The method for manufacturing a core barrel includes the welding one end part of a short ring to a lower core support plate; and machining the lower core support plate to which the short ring is welded. The machining of the lower core support plate includes: forming a placement surface on which the fuel assembly is to be placed; and forming a fuel alignment pin hole, in which a fuel alignment pin for positioning the fuel assembly is to be inserted. After the machining of the lower core support plate, a main body barrel is welded to the other end part of the short ring, where the main body barrel covers the reactor core including the fuel assembly to be placed on the placement surface.

In addition, the core barrel according to the embodiment is to be disposed in a pressure vessel of a pressurized water reactor and is to hold a reactor core including a fuel assembly. The core barrel includes: a lower core support plate having a placement surface on which the fuel assembly is to be placed and having a fuel alignment pin hole in which a fuel alignment pin for positioning the fuel assembly is to be inserted; a main body barrel which covers the reactor core including the fuel assembly to be placed on the placement surface of the lower core support plate; and a short ring one end part of which is welded to the lower core support plate and the other end part of which is welded to the main body barrel.

Hereinafter, with reference to the drawings, a core barrel and a method for manufacturing a core barrel in the embodiment of the present invention will be described.

First, with reference to FIG. 1, a schematic configuration of a pressurized water reactor will be described.

Figure 1:
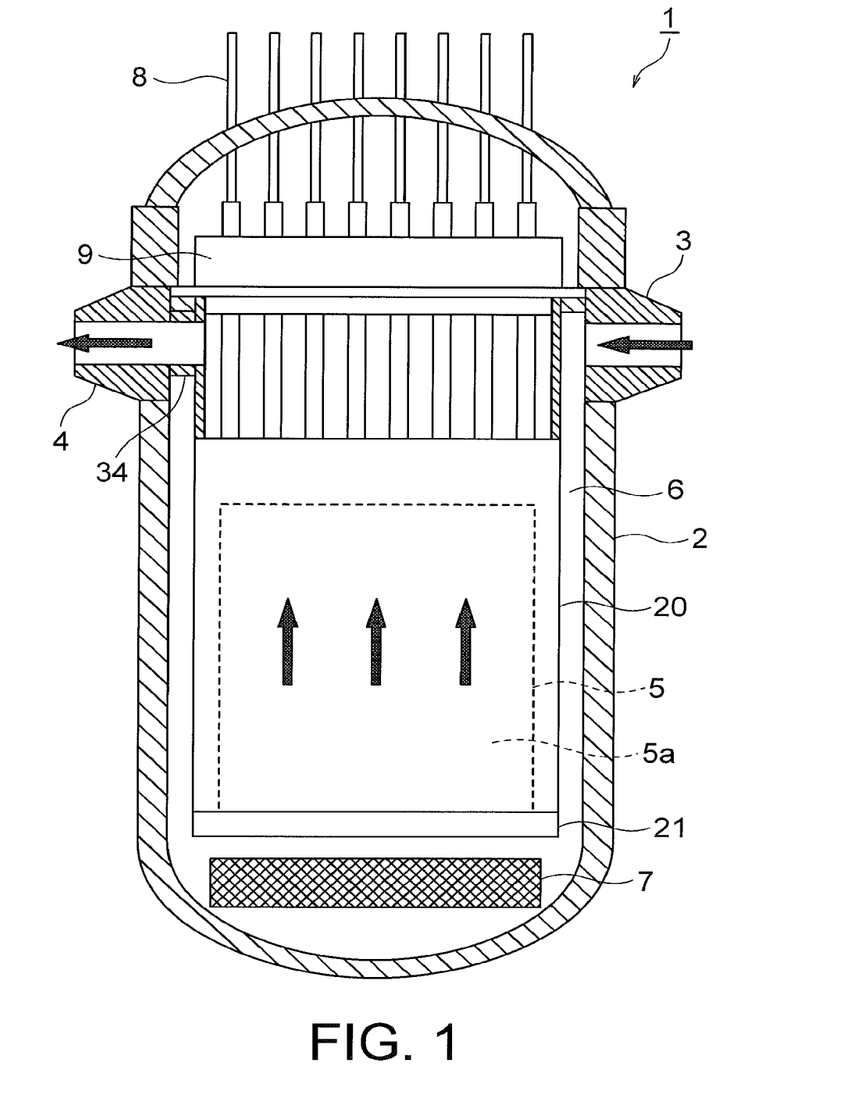
FIG. 1 is a vertical sectional view showing an example of a schematic configuration of a pressurized water reactor of an embodiment.

As shown in FIG. 1, a pressurized water reactor 1 includes a reactor pressure vessel 2 in a cylindrical shape having a central axial line extending in the vertical direction (top-and-bottom direction in FIG. 1), a coolant inlet nozzle 3 and a coolant outlet nozzle 4 provided in the reactor pressure vessel 2, and a core barrel 20 disposed in the reactor pressure vessel 2. Of the above components, on the core barrel 20 is provided a nozzle 34, and the nozzle 34 communicates with the coolant outlet nozzle 4 so that mixing with coolant flowing from the coolant inlet nozzle 3 is prevented.

The core barrel 20 contains and holds a reactor core 5 including a fuel assembly 5a. The core barrel 20 has a lower core support plate 21 to be described later, and the fuel assembly 5a of the reactor core 5 is placed on the lower core support plate 21.

Coolant flows from a pipe (not shown) outside the reactor pressure vessel 2 through the coolant inlet nozzle 3 into the reactor pressure vessel 2. The coolant having flown in flows downward in a down corner 6 formed between a side wall of the reactor pressure vessel 2 and the core barrel 20, and the direction of the flow is changed to upward by a flow skirt 7 provided in the lower part of the reactor pressure vessel 2. Then the coolant flows through the flow holes 24 (see FIG. 3) of the lower core support plate 21 into the reactor core 5. The coolant having flown into the reactor core 5 cools the fuel, so that the temperature of the coolant is raised; and the coolant flows from the reactor core 5 and flows through the nozzle 34 and the coolant outlet nozzle 4 out to a pipe (not shown) outside the reactor pressure vessel 2.

In the upper part of the reactor pressure vessel 2, there is disposed a control rod drive mechanism 8, and control rods can be inserted into the reactor core 5 so as to control the output of the reactor and stop the reaction in the reactor at a time of emergency. Further, in the upper part of the reactor pressure vessel 2, there is disposed an lower core support plate 9, and the reactor core 5 is held from above.

Next, with reference to FIG. 2, the core barrel 20 in the present embodiment will be described.

Figure 2:
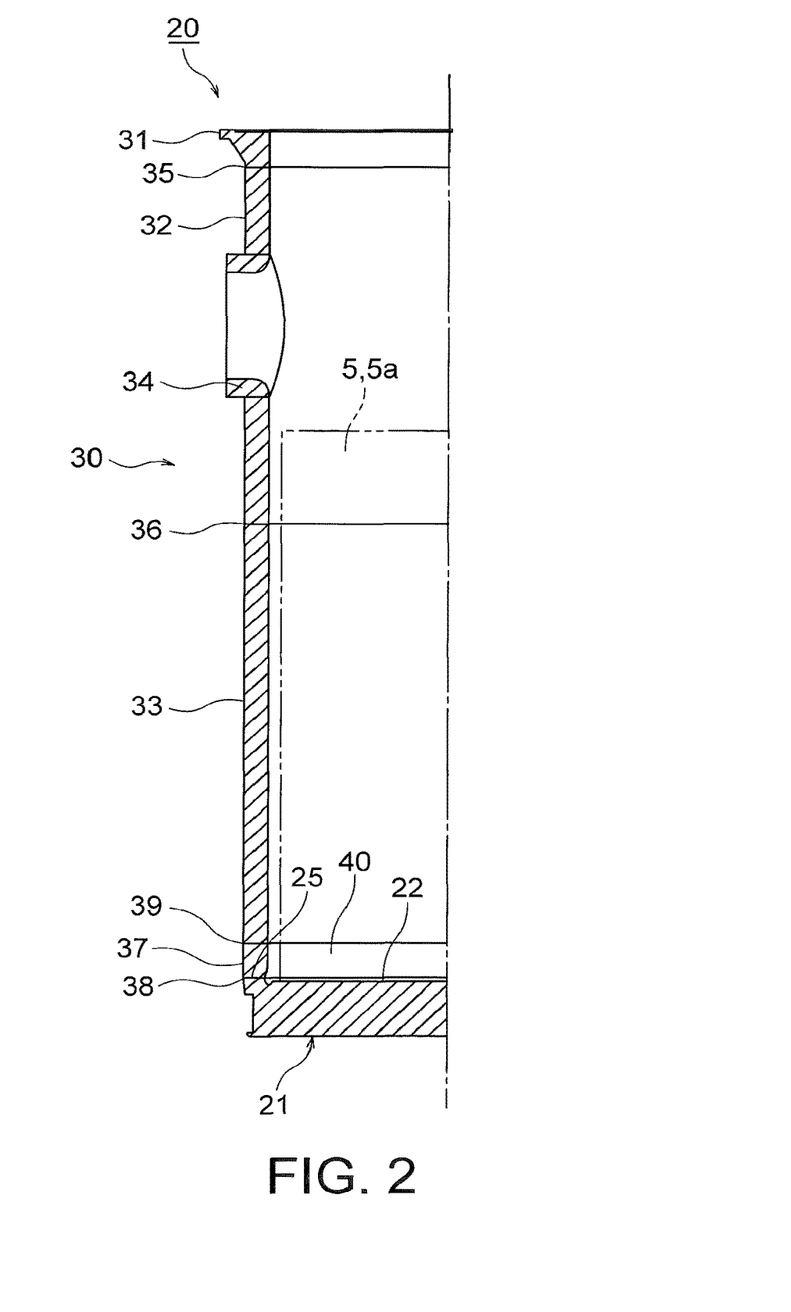
FIG. 2 is a vertical sectional view of a core barrel in the pressurized water reactor of FIG. 1, where the right half is not shown.

As shown in FIG. 2, the core barrel 20 has the lower core support plate 21 on which the fuel assembly 5a is to be placed, and a main body barrel 30 which covers the reactor core 5 including the fuel assembly 5a to be placed on the lower core support plate 21. Of the above components, the lower core support plate 21 is made of a plate-shaped member, and the main body barrel 30 (each barrel to be described later) is made by members in a cylindrical shape, for example, by bended plate-shaped members into a cylindrical shape and by welding the members to one another.

Figure 3:
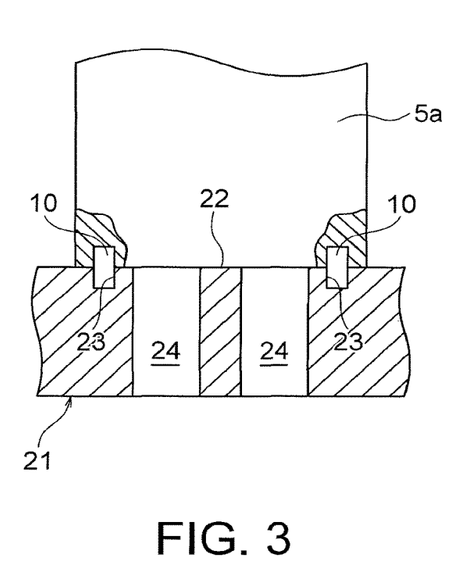
FIG. 3 is a cutout sectional view of a main part showing a configuration in which a fuel assembly is held on a lower core support plate in the pressurized water reactor of FIG. 1.

As shown in FIG. 2 and FIG. 3, the lower core support plate 21 has: a placement surface 22 on which the fuel assembly 5a is to be placed; fuel alignment pin holes 23 in which fuel alignment pins 10 for positioning the fuel assembly 5a; and the flow holes 24 through which the coolant flows. The placement surface 22, the fuel alignment pin holes 23, and the flow holes 24 are formed when the lower core support plate 21 is machined. Further, on the outer side, in the radial direction, of the placement surface 22, there is provided a junction part 25 to which a lower end part of a short ring 37 to be described later is welded.

The main body barrel 30 has: a flange 31 which is to be attached to the reactor pressure vessel 2; an upper barrel 32 extending downward from the flange 31; and a lower barrel 33 extending downward from the upper barrel 32. Of the above components, on the upper barrel 32, the nozzle 34 is provided. The flange 31, the upper barrel 32, and the lower barrel 33 are welded to one another; between the flange 31 and the upper barrel 32, there is formed a flange circumferential weld line 35; and between the upper barrel 32 and the lower barrel 33, there is formed an upper barrel circumferential weld line 36.

The lower core support plate 21 and the lower barrel 33 are coupled through the short ring 37. More specifically, one end part of the short ring 37 (lower end part) is welded at the junction part 25 of the lower core support plate 21, and the other end part (upper end part) of the short ring 37 is welded to the lower barrel 33. Between the lower core support plate 21 and the short ring 37, there is formed a lower core support plate circumferential weld line 38, and between the short ring 37 and the lower barrel 33, there is formed a lower barrel circumferential weld line 39.

The short ring 37 according to the present embodiment is formed in a ring shape having an axial direction length (length in the top-and-bottom direction in FIG. 2) shorter than the lower barrel 33, and the term "short ring" are used to represent a ring having such an axial direction length that the lower core support plate 21 can be machined after the short ring 37 is welded to the lower core support plate 21. More specifically, the short ring 37 preferably has such an axial direction length that a tool of a machining device can reach the lower core support plate 21 from an opening 40 in the upper end part of the short ring 37 after the short ring 37 is welded to the lower core support plate 21 and that the lower core support plate 21 can be machined with an intended accuracy. Such an axial direction length of the short ring 37 is preferably about 300 mm, for example. With this arrangement, it is possible to perform accurately, with the common machining device, a machining process by extending the tool to the lower core support plate 21 through the opening 40 in the upper end part of the short ring 37. In addition, since the axial direction length of the short ring 37 is made to be about 300 mm, the lower barrel circumferential weld line 39 can be located away from the lower core support plate 21, and it is possible to prevent or reduce deformation of the lower core support plate 21 when the short ring 37 and the lower barrel 33 are welded to each other or when the lower barrel circumferential weld line 39 is subjected to a heat treatment.

Figure 4:
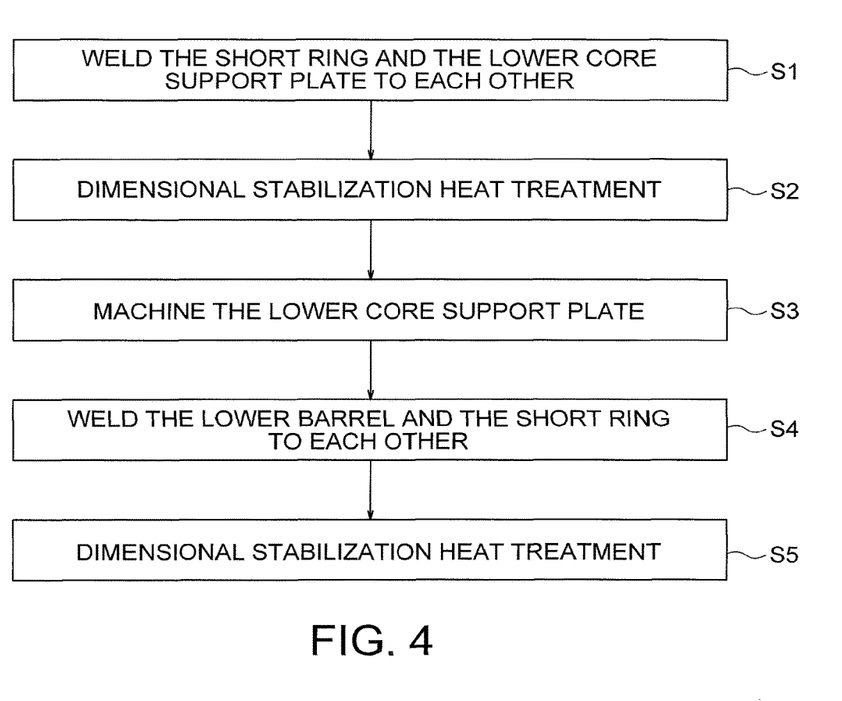
FIG. 4 is a flowchart for describing a method of manufacturing the core barrel of FIG. 2.

Next, an operation of the above configured present embodiment will be described. Here, a method for manufacturing the core barrel 20 will be described.

First, the lower end part of the short ring 37 is welded to the junction part 25 of the lower core support plate 21 (step S1). In this case, bevels (not shown) are formed on the lower end part of the short ring 37 at the junction part 25 of the lower core support plate 21, and welding is performed with the lower end part of the short ring 37 at the junction part 25 of the lower core support plate 21 butted against each other. By this process, the lower core support plate circumferential weld line 38 is formed.

Subsequently, the formed lower core support plate circumferential weld line 38 is subjected to a dimensional stabilization heat treatment (step S2). This treatment releases a residual stress in the lower core support plate circumferential weld line 38. Note that the dimensional stabilization heat treatment may be performed in a method commonly performed as a heat treatment after welding.

Next, the lower core support plate 21 is machined to form the placement surface 22, the fuel alignment pin holes 23, and the flow holes 24 (step S3). In this step, the lower core support plate 21 and the short ring 37 are fully machined to form the placement surface 22, the fuel alignment pin holes 23, and the flow holes 24 in final forms with intended accuracies. Since the residual stress in the lower core support plate circumferential weld line 38 is already released by the dimensional stabilization heat treatment in the above-described step S2, release of residual stress due to the machining process is prevented or reduced in step S3. With this arrangement, the accuracy of the machining process is successfully improved. Note that the machining process can be performed by using a machining device having a tool which reaches the lower core support plate 21 from the opening 40 in the upper end part of the short ring 37. In addition, the final shapes mean a situation in which the lower core support plate 21 and the short ring 37 are in the same shapes as when the core barrel 20 is completed.

Next, the lower barrel 33 of the main body barrel 30 which covers the reactor core 5 is welded to the upper end part of the short ring 37 (step S4). More specifically, bevels (not shown) are formed on the lower end part of the lower barrel 33 and the upper end part of the short ring 37, and welding is performed with the lower end part of the lower barrel 33 and the upper end part of the short ring 37 butted against each other. By this process, the lower barrel circumferential weld line 39 is formed. In this step, since the lower barrel circumferential weld line 39 is formed at a position away from the lower core support plate 21, deformation of the lower core support plate 21 due to the welding of the lower barrel 33 and the short ring 37 can be prevented or reduced.

After that, the formed lower barrel circumferential weld line 39 is subjected to a dimensional stabilization heat treatment (step S5). This treatment releases a residual stress in the lower barrel circumferential weld line 39. In this step, since the residual stress in the lower core support plate circumferential weld line 38 has been released in the above step S2, deformation of the lower core support plate 21 can be prevented or reduced at the time of the heat treatment in step S5. In addition, since the lower barrel circumferential weld line 39 is formed at a position away from the lower core support plate 21 as described above, deformation of the lower core support plate 21 due to the dimensional stabilization heat treatment of the lower barrel circumferential weld line 39 can be prevented or reduced.

Note that the process of welding the flange 31 and the upper barrel 32 to each other and the process of welding the upper barrel 32 and the lower barrel 33 to each other may be performed in step S5, or may be performed before or after step S5. In any of the cases, the formed flange circumferential weld line 35 and upper barrel circumferential weld line 36 are preferably subjected to a dimensional stabilization heat treatment similar to the above steps S2 and S5.

As described above, according to the present embodiment, since the lower core support plate 21 to which the lower end part of the short ring 37 is welded is machined, the placement surface 22 on which the fuel assembly 5a is to be placed and the fuel alignment pin holes 23 in which the fuel alignment pins 10 for positioning the fuel assembly 5a are inserted are formed in the lower core support plate 21, and the lower barrel 33 of the main body barrel 30 is then welded to the upper end part of the short ring 37. Thus, it is possible to locate the lower barrel circumferential weld line 39, which is to be formed after the placement surface 22 and the fuel alignment pin holes 23 are formed by machining, away from the lower core support plate 21. Therefore, it is possible to prevent or reduce deformation of the lower core support plate 21 due to the welding after the machining of the lower core support plate 21. As a result, it is possible to improve the shape accuracy of the lower core support plate 21, on which the fuel assembly 5a is to be placed, whereby the positional accuracy of the fuel assembly 5a can be improved.

Further, according to the present embodiment, the core barrel 20 can be made by welding a plate-shaped member as the lower core support plate 21 to members in a cylindrical shape such as the short ring 37 and the main body barrel 30. Thus, it is possible to manufacture the core barrel 20 at a lower cost than by a forging process.

Further, according to the present embodiment, after the lower core support plate circumferential weld line 38 formed between the short ring 37 and the lower core support plate 21 is subjected to a heat treatment, the lower core support plate 21 is subjected to a machining process. Thus, it is possible to release a residual stress in the lower core support plate circumferential weld line 38 before the lower core support plate 21 is subjected to the machining process. Therefore, it is prevented that the stress is released when the lower core support plate 21 is subjected to the machining process, whereby the accuracy of the machining process can be improved.

With the above-described embodiment, it is possible to improve the shape accuracy of the lower core support plate, on which the fuel assembly is to be placed, whereby it is possible to improve the positional accuracy of the fuel assembly.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A method for manufacturing a core barrel which is to be disposed in a reactor pressure vessel of a pressurized water reactor and includes a main body barrel including a flange configured to be attached to the reactor pressure vessel, an upper barrel extending downward from the flange, and a lower barrel extending downward from the upper barrel, the core barrel to couple with the lower core support plate thorough a short ring and to hold a reactor core including a plurality of fuel assemblies, the method comprising:

welding a first end part of a short ring in an axial direction of the core barrel, which has an axial direction length shorter than the lower barrel, to an upper portion of a lower core support plate;

machining the lower core support plate through an upper end portion of the short ring that has been welded to the lower core support plate, the machining of the lower core support plate including forming:

a placement surface on which the plurality of fuel assemblies is to be placed; and a fuel alignment pin hole, in which a fuel alignment pin for positioning the plurality of fuel assemblies is to be inserted; and welding, after the machining of the lower core support plate, a lower end of the lower barrel of the main body barrel which covers the reactor core including the plurality of fuel assemblies to be placed on the placement surface to a second opposite end part of the short ring in the axial direction.

2. The method for manufacturing a core barrel according to claim 1, wherein before the machining of the lower core support plate, a heat treatment is performed on a weld line formed between the short ring and the lower core support plate.

3. The method for manufacturing a core barrel according to claim 1, wherein the short ring has an axial direction length that the lower core support plate can be machined after welding the short ring to the lower core support plate.

4. The method for manufacturing a core barrel according to claim 1, wherein the core support plate includes a junction part is provided on an outer side, in the radial direction, of the placement surface, and the lower end of the short ring is welded to the junction part.

5. The method for manufacturing core barrel according to claim 1, wherein when of the lower core support plate is machined, the lower core support plate and the short ring are machined to final forms which are same shapes as when the core barrel is completed.

* * * * *